United States Patent
Lin

(10) Patent No.: US 11,950,723 B2
(45) Date of Patent: Apr. 9, 2024

(54) COFFEE FILTERING DEVICE WITH DUAL-LAYER FILTERING NETS

(71) Applicant: Join One Electric (Shenzhen) Co., Ltd, Guang Dong (CN)

(72) Inventor: Yu-Lung Lin, Tainan (TW)

(73) Assignee: Join One Electric (Shenzhen) Co., Ltd, Guang Dong (CN)

( * ) Notice: Subject to any disclaimer, the term of this patent is extended or adjusted under 35 U.S.C. 154(b) by 409 days.

(21) Appl. No.: 17/399,212

(22) Filed: Aug. 11, 2021

(65) Prior Publication Data

US 2022/0400887 A1     Dec. 22, 2022

(30) Foreign Application Priority Data

Jun. 16, 2021  (CN) ......................... 202121336565.9

(51) Int. Cl.
*A47J 31/06*     (2006.01)
*A47J 42/26*     (2006.01)

(52) U.S. Cl.
CPC .................................... *A47J 31/06* (2013.01)

(58) Field of Classification Search
CPC .. A47J 31/06; A47J 42/02; A47J 42/22; A47J 42/26; A47J 42/28; A47J 42/30
See application file for complete search history.

(56) References Cited

U.S. PATENT DOCUMENTS

2017/0258260 A1* 9/2017  Hsu ..................... A47J 31/0626
2021/0315410 A1* 10/2021 Cheng .................. A47J 31/525

FOREIGN PATENT DOCUMENTS

WO    WO-2018058886 A1 * 4/2018  .............. A47J 31/06

OTHER PUBLICATIONS

English translate (WO2018058886A1), retrieved date Nov. 7, 2023.*

* cited by examiner

*Primary Examiner* — Matthew Katcoff
*Assistant Examiner* — Mohammed S. Alawadi
(74) *Attorney, Agent, or Firm* — Best & Flanagan LLP

(57) ABSTRACT

A coffee filtering device includes a filtering cup, a grinding device, and a base. The filtering cup includes a first peripheral wall and a first bottom wall. First lateral filtering nets are disposed in the first peripheral wall. The first bottom wall includes a longitudinal hole and first lower filtering nets. The grinding device includes a blade unit disposed in the filtering cup and a transmission shaft coupled with the blade unit to rotate therewith. The base is disposed around the filtering cup and includes a second bottom wall connected to a lower end of a second peripheral wall which is coupled with the first peripheral wall of the filtering cup. Second lateral filtering nets are disposed in the second peripheral wall. The second bottom wall includes a longitudinal hole and second lower filtering nets. The transmission shaft extends through the longitudinal holes of the first and second bottom walls.

4 Claims, 5 Drawing Sheets

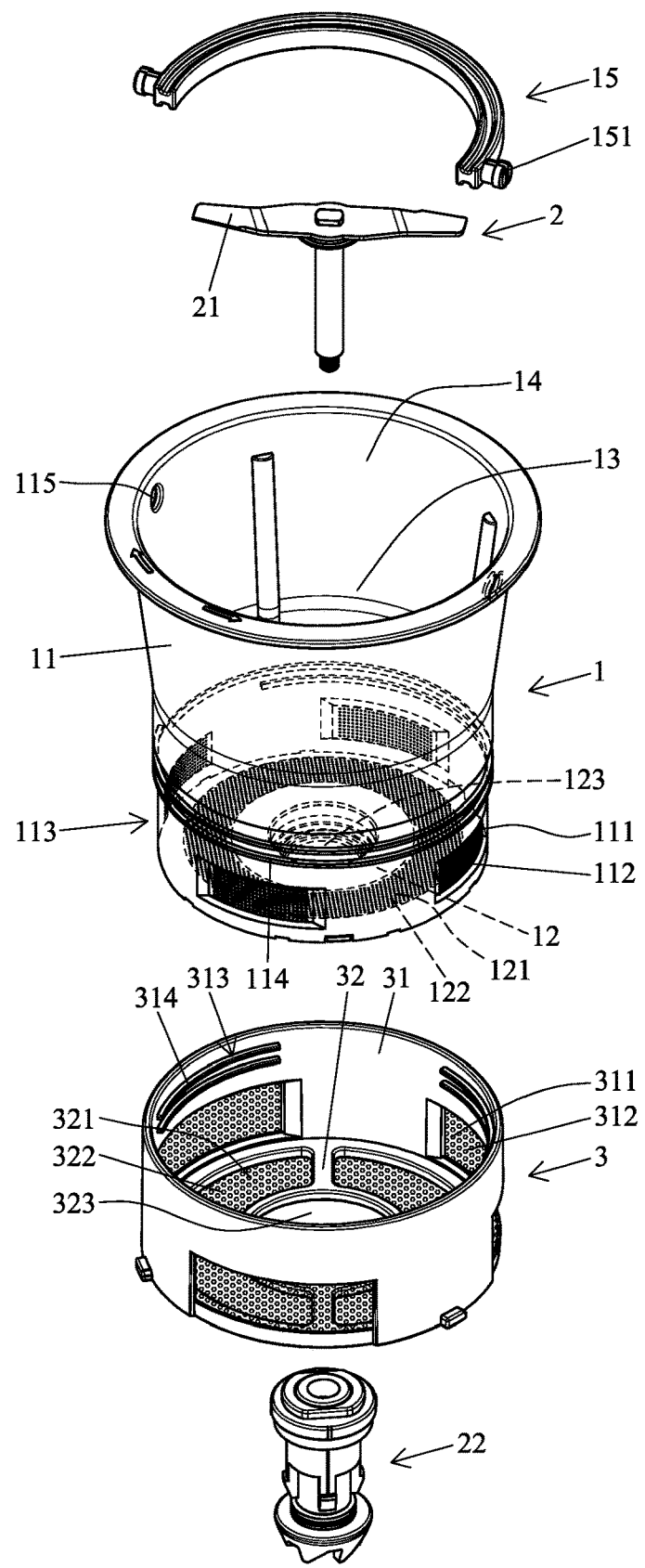
F I G . 1

COFFEE FILTERING DEVICE WITH DUAL-LAYER FILTERING NETS

BACKGROUND OF THE INVENTION

The present invention relates to a coffee filtering device with dual-layer filtering nets and, more particularly, to a device providing double filtration.

Coffee is one of favorite beverages of most people. A general way to brew coffee includes grinding coffee beans into coffee powders by manpower or a machine and then placing the coffee powders into a filtering cup. A filtering net is disposed below the filtering cup. During brewing, hot water is guided into the filtering cup and flows through the coffee powders to obtain liquid coffee which flows outward through the filtering net into an outer container. The filtering net blocks the coffee powders and, thus, prevents the coffee powders from flowing outward to the outer container, thereby avoiding influence on the taste.

To improve the brewing convenience, grinding blades are disposed in the filtering cup. The coffee beans are directly placed into the filtering cup and then ground by the grinding blades into coffee powders. Then, hot water is poured into the filtering cup to obtain liquid coffee.

However, during the direct grinding process in the filtering cup, tiny powders could fly through the filtering net to the outer side of the filtering net under the high-speed grinding force. The coffee powders falling into the container receiving the liquid coffee will affect the taste of the coffee.

BRIEF SUMMARY OF THE INVENTION

An objective of the present invention is to provide a filtering device providing double filtration for improving the taste while providing improved convenience in cleaning and assembly.

A coffee filtering device according to the present invention comprises a filtering cup, a grinding device, and a base. The filtering cup includes a first peripheral wall and a first bottom wall connected to a lower end of the first peripheral wall, defining a chamber between the first peripheral wall and the first bottom wall. The first peripheral wall includes a lower portion having a plurality of first lateral holes intercommunicating the chamber with an outer side of the filtering cup. A plurality of first lateral filtering nets is disposed in the plurality of first lateral holes. The first bottom wall includes a longitudinal hole in a central portion thereof and a plurality of first lower through-holes surrounding the longitudinal hole. A plurality of first lower filtering nets is disposed in the plurality of first lower through-holes. The first peripheral wall includes a first coupling portion on an outer periphery thereof. The grinding device includes a blade unit and a transmission shaft. The blade unit is disposed in a lower portion of the chamber. The transmission shaft extends through the longitudinal hole of the filtering cup and is coupled with the blade unit to rotate therewith. The base is disposed around the filtering cup and includes a second peripheral wall surrounding the first peripheral wall. A second bottom wall is connected to a lower end of the second peripheral wall. The second peripheral wall includes a lower portion having a plurality of second lateral holes. A plurality of second lateral filtering nets is disposed in the plurality of second lateral holes. The second bottom wall includes a longitudinal hole in a central portion thereof and a plurality of second lower through-holes surrounding the longitudinal hole of the second bottom wall. The transmission shaft extends through the longitudinal hole of the second bottom wall. A plurality of second lower filtering nets is disposed in the plurality of second lower through-holes. The second peripheral wall includes a second coupling portion coupled with the first coupling portion of the filtering cup.

In an example, the first coupling portion of the filtering cup includes an outer threading, and the second coupling portion of the base includes an inner threading in threading connection with the outer threading.

In an example, the coffee filtering device further comprises an outer container. The base includes a positioning button on an outer periphery of the second peripheral wall. The outer container includes a compartment receiving the filtering cup and the base. The compartment includes an inner wall face having a coupling member configured to couple with the positioning button of the base. The compartment further includes a bottom wall having a through-hole through which the transmission shaft extends. The outer container further includes an outlet intercommunicating with the compartment.

Coffee beans can be placed into the chamber of the filtering cup. The grinding device is activated to rotate the blade unit, grinding the coffee beans into coffee powder. During the grinding procedure, most coffee powders are stopped by the plurality of first lateral filtering nets and the plurality of first lower filtering nets, thereby remaining in the chamber. In a case that few coffee powders, which are tiny, pass through the plurality of first lateral filtering nets and the plurality of first lower filtering nets under the impact force and, thus, fall into a space between the base and the filtering cup, these coffee powders can be stopped by the plurality of second lateral filtering nets and the plurality of second lower filtering nets, avoiding these coffee powders from moving out of the base.

The present invention will become clearer in light of the following detailed description of illustrative embodiments of this invention described in connection with the drawings.

DESCRIPTION OF THE DRAWINGS

FIG. 1 is an exploded, perspective view of a coffee filtering device of an embodiment according to the present invention.

DETAILED DESCRIPTION OF THE INVENTION

Figure 2:
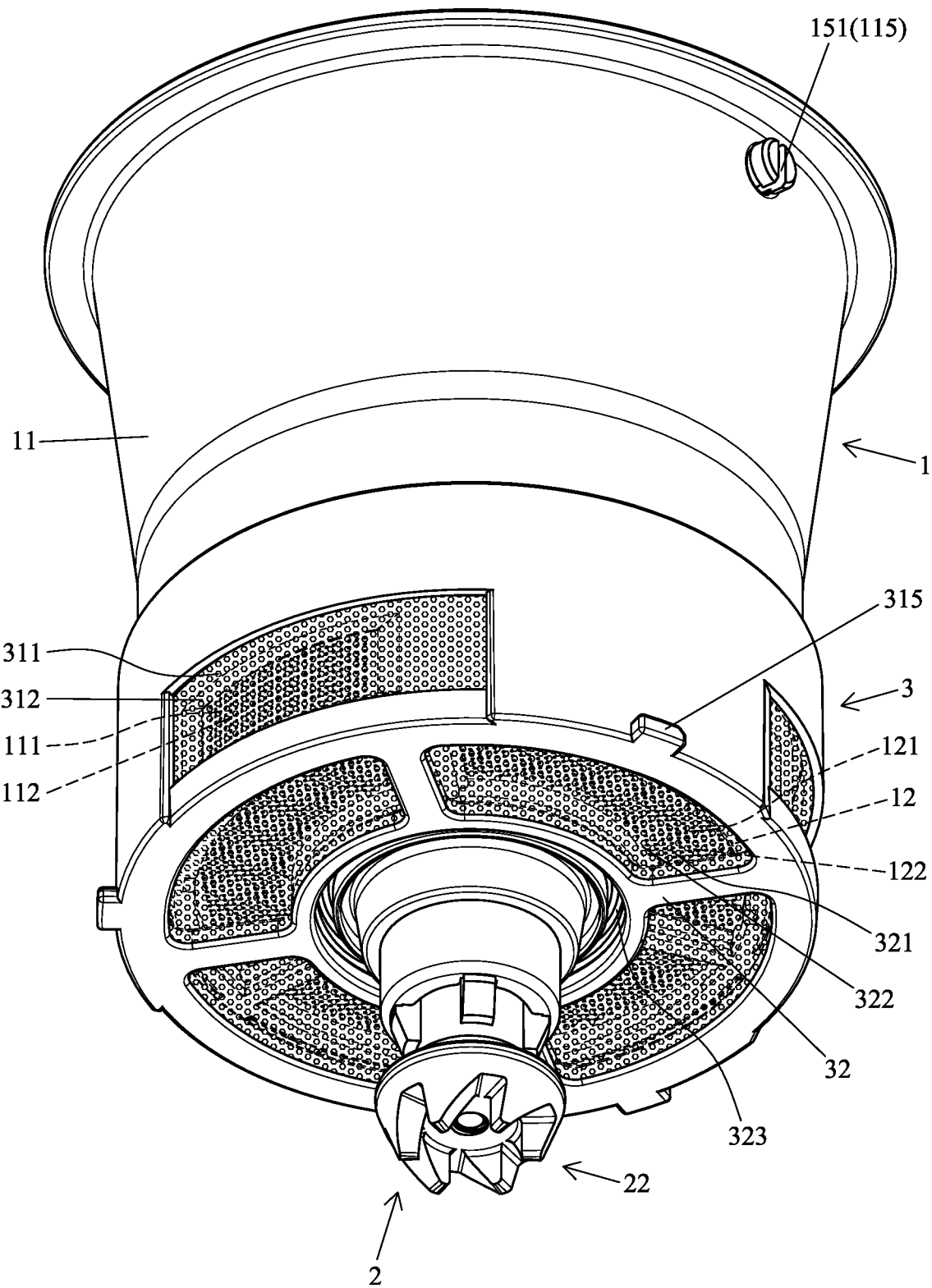
FIG. 2 is a perspective view of the coffee filtering device according to the present invention after assembly.
Figure 3:
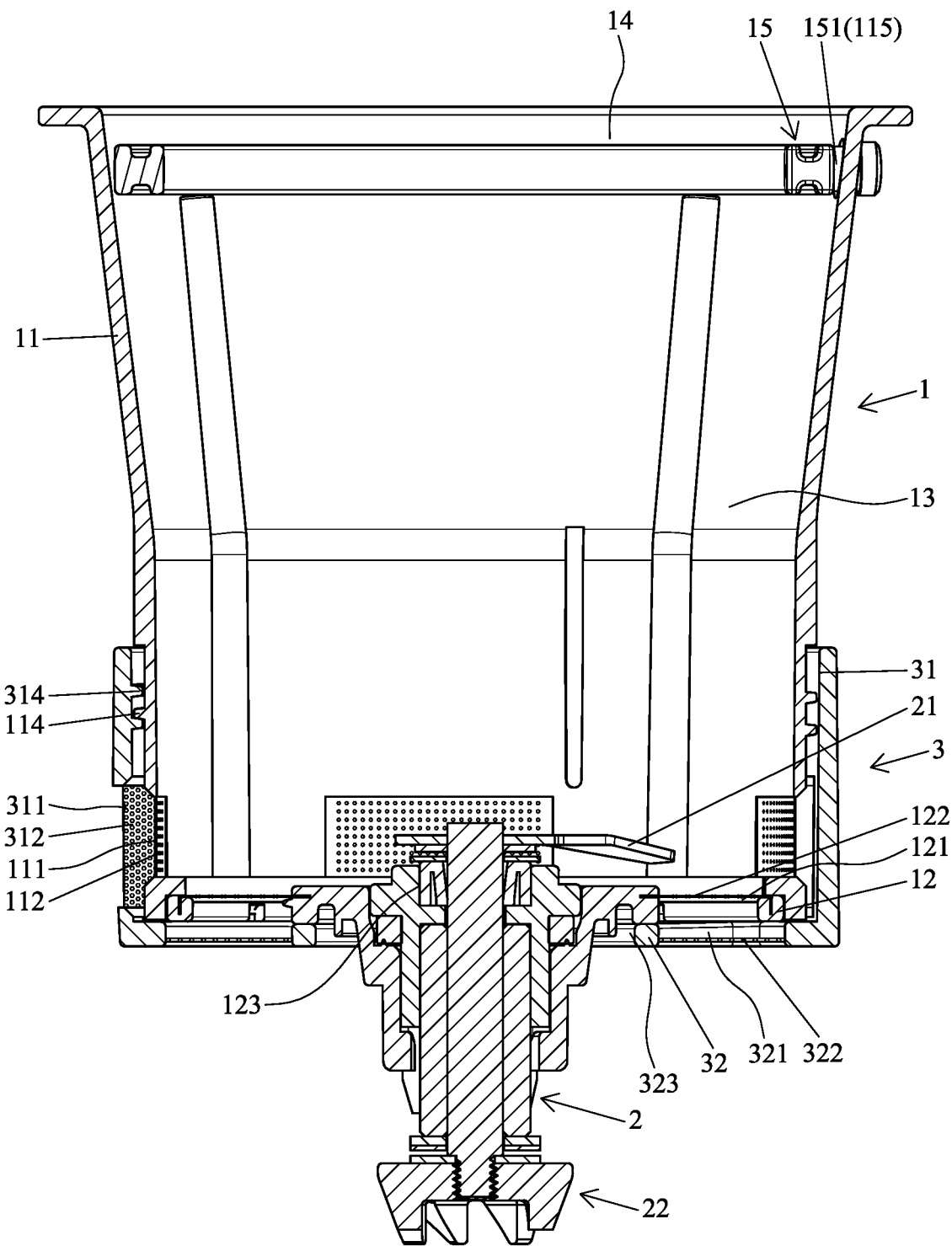
FIG. 3 is a cross sectional view of the coffee filtering device according to the present invention after assembly.

With reference to FIGS. 1-3, a coffee filtering device with dual-layer filtering nets according to the present invention comprises a filtering cup 1, a grinding device 2, and a base 3. The filtering cup 1 includes a first peripheral wall 11 and a first bottom wall 12 connected to a lower end of the first peripheral wall 11, defining a chamber 13 between the first peripheral wall 11 and the first bottom wall 12, with the chamber 13 having an open end 14 in an upper portion of the first peripheral wall 11. The first peripheral wall 11 includes a lower portion having a plurality of first lateral holes 111 intercommunicating the chamber 13 with an outer side of the filtering cup 1. A plurality of first lateral filtering nets 112 is disposed in the plurality of first lateral holes 111. The first bottom wall 12 includes a longitudinal hole 123 in a central portion thereof and a plurality of first lower through-holes 121 surrounding the longitudinal hole 123. A plurality of first lower filtering nets 122 is disposed in the plurality of first lower through-holes 121. The first peripheral wall 11 includes a first coupling portion 113 on an outer periphery thereof. The first coupling portion 113 of the filtering cup 1 includes an outer threading 114. The first peripheral wall 11 of the filtering cup 1 includes an upper portion having two pivotal holes 115. A handle 15 is disposed in the chamber 13 of the filtering cup 1 and is arcuate. The handle 15 includes two pegs 151 on two ends thereof. The two pegs 151 are pivotably coupled in the two pivotal holes 115, respectively.

The grinding device 2 includes a blade unit 21 and a transmission shaft 22. The blade unit 21 is disposed in a lower portion of the chamber 13. The transmission shaft 22 extends through the longitudinal hole 123 of the filtering cup 1 and is coupled with the blade unit 21 to rotate therewith. A bottom end of the transmission shaft 22 is coupled to a motor (not shown) for driving the transmission shaft 22.

The base 3 is disposed around the filtering cup 1 and includes a second peripheral wall 31 surrounding the first peripheral wall 11. A second bottom wall 32 is connected to a lower end of the second peripheral wall 31. The second peripheral wall 31 includes a lower portion having a plurality of second lateral holes 311. A plurality of second lateral filtering nets 312 is disposed in the plurality of second lateral holes 311. The second bottom wall 32 includes a longitudinal hole 323 in a central portion thereof and a plurality of second lower through-holes 321 surrounding the longitudinal hole 323 of the second bottom wall 32. The transmission shaft 22 extends through the longitudinal hole 323 of the second bottom wall 32. A plurality of second lower filtering nets 322 is disposed in the plurality of second lower through-holes 321. The second peripheral wall 31 includes a second coupling portion 313 coupled with the first coupling portion 113 of the filtering cup 1. The second coupling portion 313 of the base 3 includes an inner threading 314 in threading connection with the outer threading 114 of the filtering cup 1.

Figure 4:
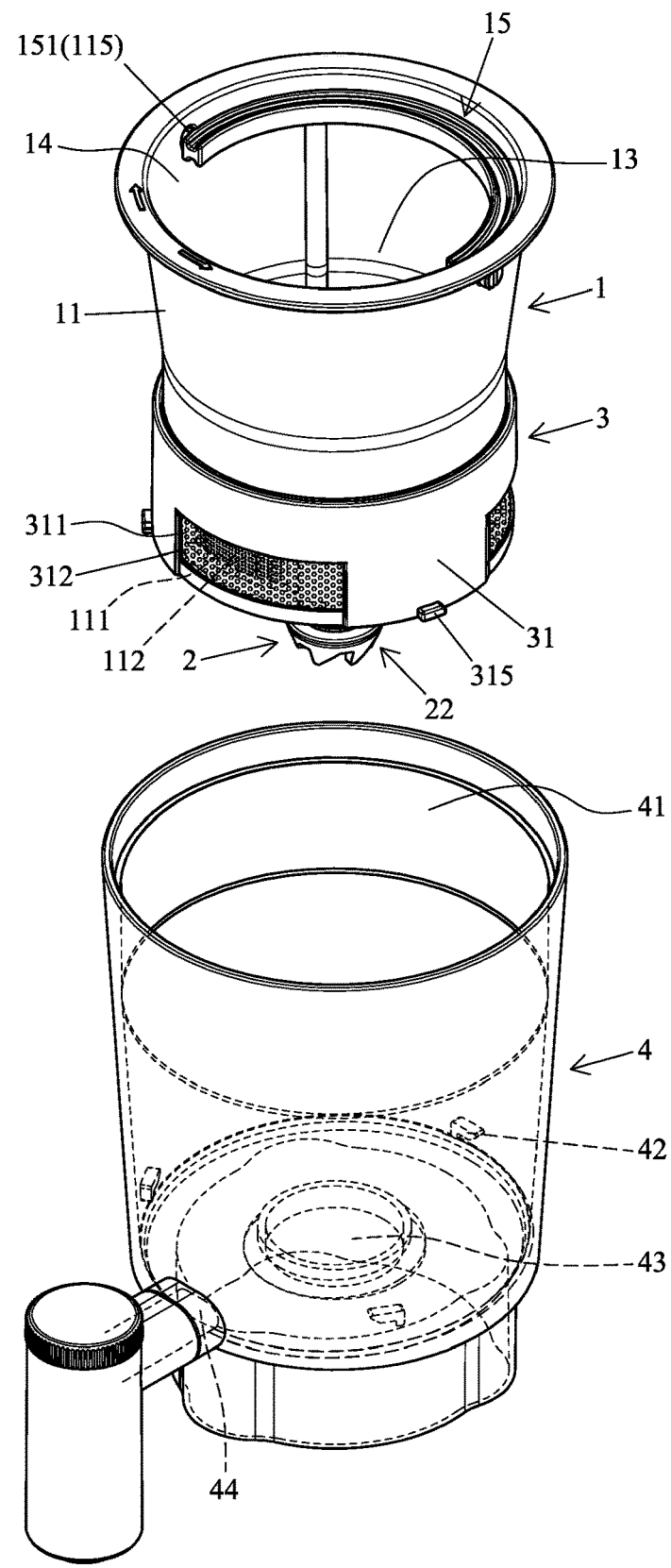
FIG. 4 is an exploded, perspective view of the coffee filtering device and an outer container for receiving the coffee filtering device according to the present invention.
Figure 5:
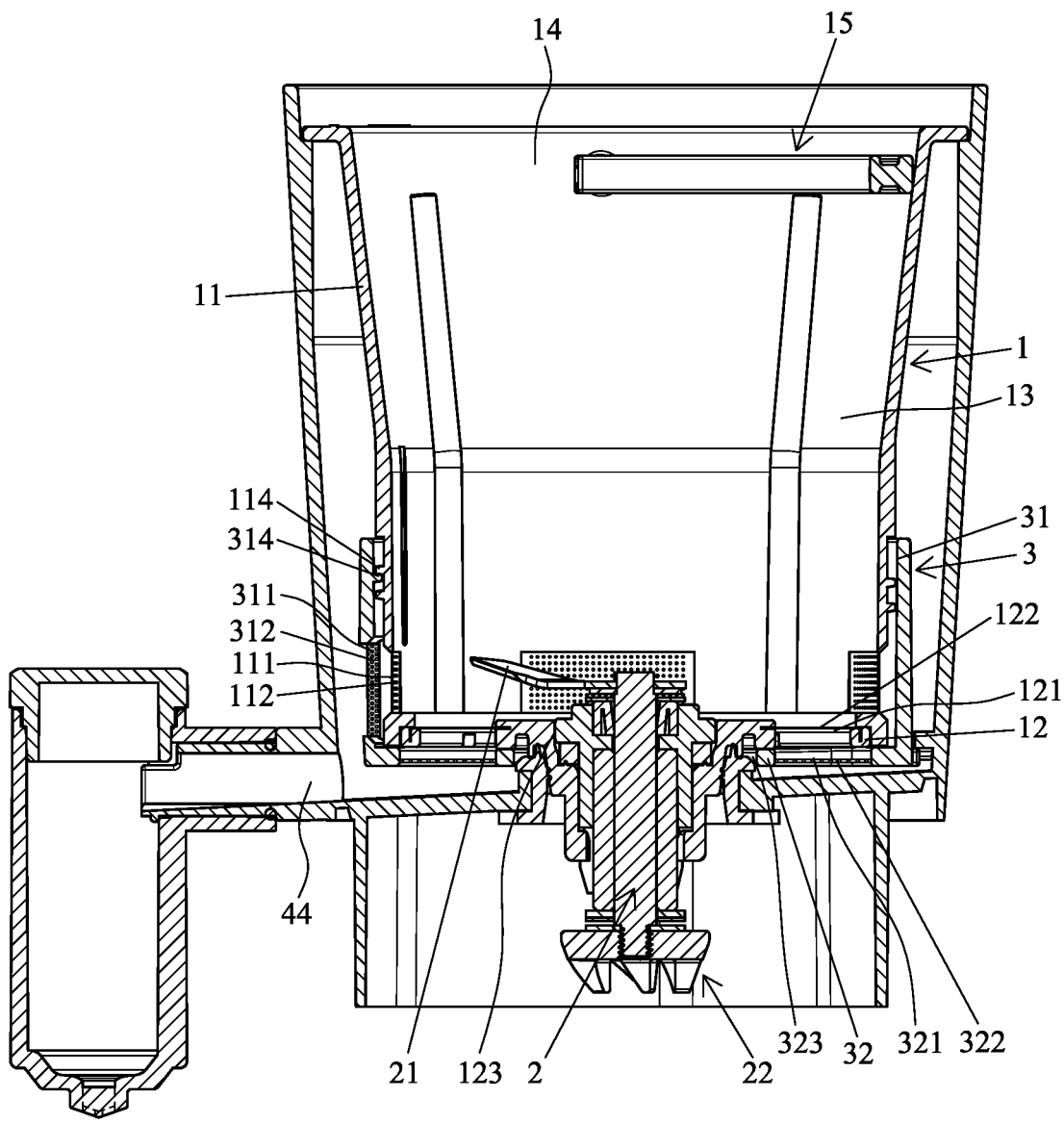
FIG. 5 is a cross sectional view of the coffee filtering device received in the outer container.

With reference to FIGS. 4 and 5, the coffee filtering device according to the present invention can further comprise an outer container 4. The base 3 incudes a positioning button 315 on an outer periphery of the second peripheral wall 31. The outer container 4 includes a compartment 41 receiving the filtering cup 1 and the base 3. The compartment 41 includes an inner wall face having a coupling member 42 configured to couple with the positioning button 315 of the base 3. The compartment 41 further includes a bottom wall having a through-hole 43 through which the transmission shaft 22 extends. The outer container 4 further includes an outlet 44 intercommunicating with the compartment 41.

In assembly, the inner threading 314 of the base 3 is threadedly connected to the outer threading 114 of the filtering cup 1. The base 3 and the first peripheral wall 11 of the filtering cup 1 are sealingly coupled. The grinding device 2 is then coupled to the filtering cup 1. Furthermore, the base 3 is disposed in the outer container 4. The positioning button 315 is coupled with the coupling member 42. The outer container 4 is disposed on a coffee machine (not shown), and the grinding device 2 is coupled to the motor of the coffee machine.

Coffee beans (not shown) can be placed into the chamber 13 of the filtering cup 1. The grinding device 2 is activated to rotate the blade unit 21, grinding the coffee beans into coffee powder. During the grinding procedure, most coffee powders are stopped by the plurality of first lateral filtering nets 112 and the plurality of first lower filtering nets 122, thereby remaining in the chamber 13. In a case that few coffee powders, which are tiny, pass through the plurality of first lateral filtering nets 112 and the plurality of first lower filtering nets 122 under the impact force and, thus, fall into a space between the base 3 and the filtering cup 1, these coffee powders can be stopped by the plurality of second lateral filtering nets 312 and the plurality of second lower filtering nets 322, avoiding these coffee powders from moving out of the base 3.

After grinding the coffee powders, hot water is poured into the chamber 13 of the filtering cup 1. After extraction, the liquid coffee flows through the plurality of first lateral filtering nets 112 and the plurality of first lower filtering nets 122 into the space between the filtering cup 1 and the base 3 and then flows through the plurality of second lateral filtering nets 312 and the plurality of second lower filtering nets 322 into the outer container 4 and is guided outward via the outlet 44. Since the filtering cup 1 and the base 3 provide double blocking for the coffee powders, the coffee powders will not be guided to the outside via the outlet 44, providing better taste. Furthermore, the plurality of first lateral filtering nets 112 and the plurality of first lower filtering nets 122 provided at the first peripheral wall 11 and the first bottom wall 12 of the filtering cup 1 and the plurality of second lateral filtering nets 312 and the plurality of second lower filtering nets 322 provided at the second peripheral wall 31 and the second bottom wall 32 of the base 3 provide improved guiding effect for guiding the liquid coffee outward without blocking.

The positioning button 315 of the base 3 can be detached from the coupling member 42 of the outer container 4. The handle 15 permits easy detachment of the filtering cup 1 and the base 3 from the outer container 4. The inner threading 314 of the base 3 can be disengaged from the outer threading 114 of the filtering cup 1. Thus, the coffee powders remaining on the base 3 and the filtering cup 1 can be easily cleaned, providing convenient cleaning.

Although specific embodiments have been illustrated and described, numerous modifications and variations are still possible without departing from the scope of the invention. The scope of the invention is limited by the accompanying claims.

The invention claimed is:

1. A coffee filtering device comprising:
a filtering cup including a first peripheral wall and a first bottom wall connected to a lower end of the first peripheral wall, defining a chamber between the first peripheral wall and the first bottom wall, wherein the first peripheral wall includes a lower portion having a plurality of first lateral holes intercommunicating the chamber with an outer side of the filtering cup, wherein a plurality of first lateral filtering nets is disposed in the plurality of first lateral holes, wherein the first bottom wall includes a longitudinal hole in a central portion thereof and a plurality of first lower through-holes surrounding the longitudinal hole, wherein a plurality of first lower filtering nets is disposed in the plurality of first lower through-holes, and wherein the first peripheral wall includes a first coupling portion on an outer periphery thereof; a grinding device including a blade unit and a transmission shaft, wherein the blade unit is disposed in a lower portion of the chamber, wherein the transmission shaft extends through the longitudinal hole of the filtering cup and is coupled with the blade unit to rotate therewith; and a base disposed around the filtering cup and including a second peripheral wall surrounding the first peripheral wall, wherein a second bottom wall is connected to a lower end of the second peripheral wall, wherein the second peripheral wall includes a lower portion having a plurality of second lateral holes, wherein a plurality of second lateral filtering nets is disposed in the plurality of second lateral holes, wherein the second bottom wall includes a longitudinal hole in a central portion thereof and a plurality of second lower through-holes surrounding the longitudinal hole of the second bottom wall, wherein the transmission shaft extends through the longitudinal hole of the second bottom wall, wherein a plurality of second lower filtering nets is disposed in the plurality of second lower through-holes, and wherein the second peripheral wall includes a second coupling portion coupled with the first coupling portion of the filtering cup.

2. The coffee filtering device as claimed in claim 1, wherein the first coupling portion of the filtering cup includes an outer threading, and wherein the second coupling portion of the base includes an inner threading in threading connection with the outer threading.

3. The coffee filtering device as claimed in claim 1, wherein the first peripheral wall of the filtering cup includes an upper portion having two pivotal holes, wherein a handle is disposed in the chamber of the filtering cup and is arcuate, wherein the handle includes two pegs on two ends thereof, and wherein the two pegs are pivotably coupled in the two pivotal holes, respectively.

4. The coffee filtering device as claimed in claim 1, further comprising an outer container, wherein the base includes a positioning button on an outer periphery of the second peripheral wall, wherein the outer container includes a compartment receiving the filtering cup and the base, wherein the compartment includes an inner wall face having a coupling member configured to couple with the positioning button of the base, wherein the compartment further includes a bottom wall having a through-hole through which the transmission shaft extends, and wherein the outer container further includes an outlet intercommunicating with the compartment.

* * * * *